C. A. GLICKERT.
GAGE.
APPLICATION FILED NOV. 23, 1910.

997,989.

Patented July 18, 1911.

Witnesses
Frank A. Fahl
May Layden

Inventor
Charles A. Glickert,
By Bradford Hood
Attorneys.

COLUMBIA PLANOGRAPH CO., WASHINGTON, D. C.

UNITED STATES PATENT OFFICE.

CHARLES A. GLICKERT, OF INDIANAPOLIS, INDIANA.

GAGE.

997,989.  Specification of Letters Patent.  Patented July 18, 1911.

Application filed November 23, 1910. Serial No. 593,765.

*To all whom it may concern:*

Be it known that I, CHARLES A. GLICKERT, a citizen of the United States, residing at Indianapolis, in the county of Marion and State of Indiana, have invented a new and useful Gage, of which the following is a specification.

The object of my invention is to produce an efficient but simple tool by means of which the angles of wedges or coniform members may be accurately determined, the tool being preferably embodied in conjunction with a micrometer member, although not necessarily so.

The accompanying drawings illustrate a desirable micrometer form of my invention.

Figure 1:
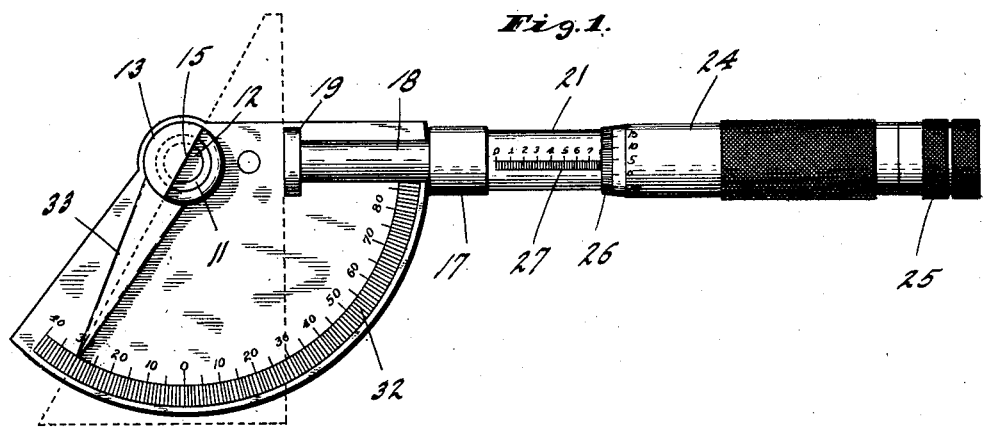
Figure 2:
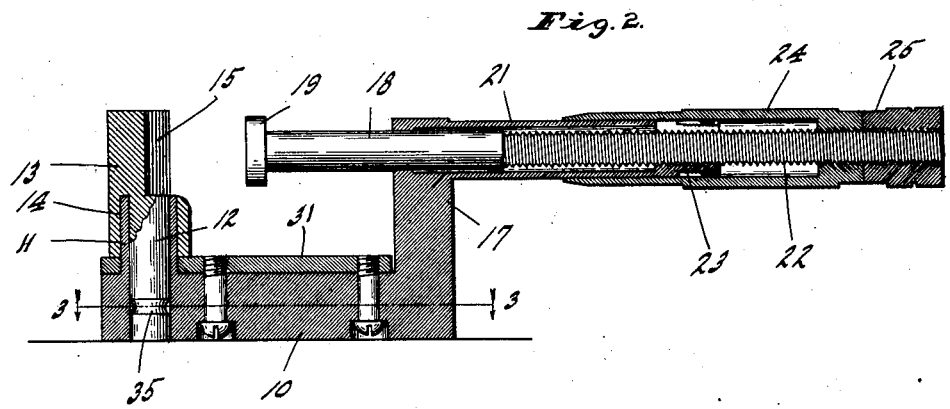
Figure 4:
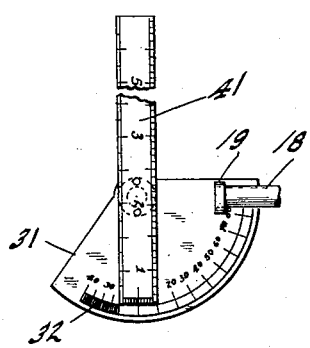
Figure 3:
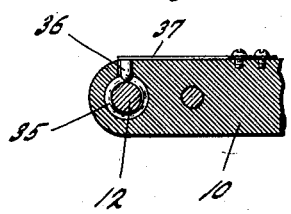

Figure 1 is a plan; Fig. 2 an axial section; Fig. 3 a fragmentary detail on line 3, 3 of Fig. 2, and Fig. 4 a plan on a smaller scale of a slight modification.

In the drawings, 10 indicates a main body provided near one end with an upwardly extending sleeve 11, within which is journaled a pin 12 preferably formed integral with a rotary gage head 13 said head being formed with an annular socket 14 concentric with pin 12 for the reception of the sleeve 11. Head 13 is provided with a gage face 15 which is parallel with the axis of pin 12 and preferably extends through said axis. Main body 10 is provided at one end with a bracket or arm 17 in which is mounted an abutment rod 18 provided with a head 19 adapted to coöperate with the gage face 15, the rod 18 being movable in a right line so as to shift the abutment 19 toward and from the gage face 15.

It will be understood that the character of mounting of the rod 18 may be considerably varied and in the present drawings I have shown this mounting as of the micrometer type. For this purpose, bracket 17 is provided with a tubular extension 21 within which the rod 18 is journaled for both rotative and axial movement. The end of rod 18 is provided with screw threads 22 which are threaded through threads 23 formed within the bore of sleeve 21. Threaded upon threads 22 is a gage sleeve 24 held in any desired position upon the threads 22 by a check nut 25. Gage sleeve 24 fits snugly over sleeve 21 and is provided with the usual scale 26 which coöperates with a scale 27 marked upon sleeve 21.

Secured to main body 10 and lying at right angles to the axis of pin 12 is a plate 31 provided with a protractor scale 32 which is arranged to be traversed by an indicator finger 33 carried by head 13. The plate 31 may be formed integral with the main body 10 if desired but it is desirable to have it detachable as shown.

I prefer to have the head 13, with its pin 12, readily removable from the tool but yet so mounted as not to be readily displaced and for this purpose I provide pin 12 with a circumferential groove 35 into which projects a locking pin 36 carried by a light spring 37 secured to the side of body 10, the arrangement being such that the pin 12 may be readily withdrawn or replaced. If desired, the tool may also be equipped with an ordinary bar scale 41 provided on its under face with a suitable pin like pin 12.

In operation, the article to be measured may be readily inserted between the face of head 19 and the gage face 15, the said gage face 15 swinging about its axis to the proper angle of the article to be measured. When the head 19 is brought up against the article the reading of the scales 26, 27 will indicate the distance across the beveled article along the line of the axis of the rod 18, between head 19 and gage face 15.

I claim as my invention:

1. An angle gage comprising a main body provided with a tubular standard, a gage head provided with a central pin journaled in the tubular standard, said gage head having a gage face substantially parallel with the axis of the pin, and also having an indicator finger, and a coöperating abutment mounted in the main body and movable toward and from the face of said gage head.

2. An angle gage comprising a main body provided with a tubular standard, a protractor plate sleeved over said tubular standard and held upon the main body, a gage head provided with a central pin journaled in the tubular standard, said gage head having a gage face substantially parallel with the axis of the pin, and also having an indicator finger arranged to coöperate with the protractor plate, and a coöperating abutment mounted in the main body and movable toward and from the face of said gage head.

3. An angle gage comprising a main body provided with a tubular standard, a gage head provided with a central pin journaled in the tubular standard and having an annular pocket to receive said tubular standard, said gage head having a gage face substantially parallel with the axis of the pin, and also having an indicator finger, and a cooperating abutment mounted in the main body and movable toward and from the face of said gage head.

4. An angle gage comprising a main body provided with a tubular standard, a protractor plate sleeved over said tubular standard and held upon the main body, a gage head provided with a central pin journaled in the tubular standard and having an annular pocket to receive said tubular standard, said gage head having a gage face substantially parallel with the axis of the pin, and also having an indicator finger arranged to coöperate with the protractor plate, and a coöperating abutment mounted in the main body and movable toward and from the face of said gage head.

5. An angle gage comprising a main body provided with a tubular standard, a gage head provided with a central pin journaled in the tubular standard, said gage head having a gage face substantially parallel with the axis of the pin, and also having an indicator finger, a standard carried by the main body in opposition to the gage head, and a micrometer plunger mounted in said standard to form a coöperating abutment movable toward and from the face of the gage head.

6. An angle gage comprising a main body provided with a tubular standard, a protractor plate sleeved over said tubular standard and held upon the main body, a gage head provided with a central pin journaled in the tubular standard, said gage head having a gage face substantially parallel with the axis of the pin, and also having an indicator finger arranged to coöperate with the protractor plate, a standard carried by the main body in opposition to the gage head, and a micrometer plunger mounted in said standard to form a coöperating abutment movable toward and from the face of the gage head.

7. An angle gage comprising a main body provided with a tubular standard, a gage head provided with a central pin journaled in the tubular standard and having an annular pocket to receive said tubular standard, said gage head having a gage face substantially parallel with the axis of the pin, and also having an indicator finger, a standard carried by the main body in opposition to the gage head, and a micrometer plunger mounted in said standard to form a coöperating abutment movable toward and from the face of the gage head.

8. An angle gage comprising a main body provided with a tubular standard, a protractor plate sleeved over said tubular standard and held upon the main body, a gage head provided with a central pin journaled in the tubular standard and having an annular pocket to receive said tubular standard, said gage head having a gage face substantially parallel with the axis of the pin, and also having an indicator finger arranged to coöperate with the protractor plate, a standard carried by the main body in opposition to the gage head, and a micrometer plunger mounted in said standard to form a coöperating abutment movable toward and from the face of the gage head.

In witness whereof, I have hereunto set my hand and seal at Indianapolis, Indiana, this 19th day of November, A. D. one thousand nine hundred and ten.

CHARLES A. GLICKERT. [L. S.]

Witnesses:
 ARTHUR M. HOOD,
 FRANK A. FAHLE.

Copies of this patent may be obtained for five cents each, by addressing the "Commissioner of Patents, Washington, D. C."